United States Patent
Woodland et al.

(10) Patent No.: US 9,452,834 B2
(45) Date of Patent: *Sep. 27, 2016

(54) AIRCRAFT BASED NON-DEDICATED SPECIAL MISSION POD MOUNTING APPARATUS

(71) Applicant: 1281329 Alberta Ltd., Calgary (CA)

(72) Inventors: Richard L. K. Woodland, Homosassa, FL (US); Ross James Neyedly, Calgary (CA)

(73) Assignee: 1281329 Alberta Ltd., Calgary, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,710

(22) Filed: Jan. 8, 2014

(65) Prior Publication Data

US 2014/0291450 A1   Oct. 2, 2014

Related U.S. Application Data

(63) Continuation of application No. 12/734,159, filed as application No. PCT/US2008/011766 on Oct. 15, 2008, now Pat. No. 8,657,230.

(60) Provisional application No. 60/999,316, filed on Oct. 17, 2007.

(51) Int. Cl.
*B64C 1/14* (2006.01)
*B64D 7/00* (2006.01)
*B64C 1/36* (2006.01)
*B64D 47/08* (2006.01)

(52) U.S. Cl.
CPC ............... *B64D 7/00* (2013.01); *B64C 1/1461* (2013.01); *B64C 1/36* (2013.01); *B64D 47/08* (2013.01)

(58) Field of Classification Search
USPC ......... 244/118.1, 137.1, 137.4, 118.2, 129.1, 244/129.5; 89/1.54, 1.58, 1.59, 37.16, 89/37.17, 37.21, 37.22
See application file for complete search history.

(56) References Cited

U.S. PATENT DOCUMENTS 4,044,364 A   8/1977   Prinzo
4,114,839 A   9/1978   Sibley et al.
(Continued)

FOREIGN PATENT DOCUMENTS

WO   WO 9816421 A1   4/1998

OTHER PUBLICATIONS

International Search Report from PCT/US08/11766, Mar. 27, 2009.

*Primary Examiner* — Benjamin P Lee
(74) *Attorney, Agent, or Firm* — Baker Botts L.L.P.

(57) ABSTRACT

Particular embodiments comprise a non-dedicated, temporarily installed, airborne special mission payload mounting system which is mechanically interfaced to the Air Deployment System (ADS) rails of a host cargo aircraft. An Adaptive Mounting Plate (AMP) is placed over an ADS rail section and restrained in position. Once the AMP is secured, an articulated or fixed position strut can be attached to it through the opened side doorway without removing the original door. Once the fixed position or articulated strut is bolted to the AMP, a one piece or segmented two piece pressurized door plug indented along its lower periphery to accommodate the protruding form factor of the fixed position or articulated strut is installed within the vacant doorway above the strut providing an airtight seal and thereby permitting pressurization of the aircraft.

19 Claims, 10 Drawing Sheets

(56) References Cited

U.S. PATENT DOCUMENTS

| | | |
|---|---|---|
| 4,588,147 A | 5/1986 | Lindsey, Jr. |
| 4,593,288 A | 6/1986 | Fitzpatrick |
| 4,746,082 A | 5/1988 | Syms et al. |
| 5,927,648 A | 7/1999 | Woodland |
| 6,267,039 B1 | 7/2001 | Czarnecki |
| 6,616,097 B2 | 9/2003 | Hilbert |
| 6,886,773 B2 | 5/2005 | Peckham et al. |
| 6,929,214 B2 | 8/2005 | Ackleson et al. |
| 7,165,627 B2 | 1/2007 | Hutter et al. |
| 7,387,276 B1 | 6/2008 | Smith et al. |
| 7,610,841 B2 | 11/2009 | Padan |
| 7,726,604 B1 | 6/2010 | Smith et al. |
| 7,726,605 B1 | 6/2010 | Smith et al. |
| 2003/0057326 A1 | 3/2003 | Medina et al. |
| 2005/0029398 A1 | 2/2005 | Lowe et al. |
| 2005/0029399 A1 | 2/2005 | Lowe et al. |
| 2005/0279797 A1 | 12/2005 | Martin et al. |
| 2006/0284011 A1 | 12/2006 | Pasty |
| 2010/0206988 A1 | 8/2010 | Woodland |

AIRCRAFT BASED NON-DEDICATED SPECIAL MISSION POD MOUNTING APPARATUS

PRIORITY

This application is a continuation under 35 U.S.C. §120 of U.S. patent application Ser. No. 12/734,159, filed 14 Apr. 2010, which claims the benefit under 35 U.S.C. §119(e) of U.S. Provisional Application No. 60/999,316, filed 17 Oct. 2007, each of which is incorporated herein by reference. This application claims the benefit under 35 U.S.C. §265(c) of International Patent Application No. PCT/US08/11766, filed 15 Oct. 2008, which claims the benefit under 35 U.S.C. §119(e) of U.S. Provisional Application No. 60/999,316, filed 17 Oct. 2007, each of which is incorporated herein by reference.

FIELD OF THE INVENTION

This invention relates to a temporarily mounted, portable, modular, aircraft-based special mission mounting system which does not require airframe modifications to accommodate the external carriage of unique airborne hardware suites including command, control, communications, computer, intelligence, surveillance, reconnaissance, ($C^4ISR$) sensing, detection, targeting, tracking, communications relay, unmanned vehicle telemetry, aircraft self defense pods, or jettisonable stores.

BACKGROUND OF THE INVENTION

Aircraft-based platforms are ideally suited for time sensitive emergency, as well as routine, sensing or other electronic based search, monitoring, surveillance and response activities. For example, numerous civilian and military based aircraft response agencies require high resolution aerial thermal (IR), radar, ultra violet (UV), photographic, multi-spectral, hyperspectral or other sensor imagery in a timely manner. Similarly, such agencies may also require electronics intelligence (ELINT) data, communications relay, communications intelligence (COMINT) data, signals intelligence (SIGINT) data, communications jamming, satellite communications (SATCOM), satellite telemetry, electronic support measures (ESM), electronics countermeasures (ECM) or anti submarine warfare (ASW), magnetic anomaly detection (MAD) or missile counter measures (MCM) pods or other types of electronic or image sensing information pods in a timely fashion to formulate a given response.

Existing aircraft mounting methodologies for these or related $C^4ISR$ electronics and sensors are typically packaged in systems dedicated to a specific aircraft, or partially dedicated in as much that a given system can be mounted within a pod which can be moved between aircraft but still necessitates air frame modifications to accommodate wing or belly mounting pylons typical of the USAF RC-12.

As an alternative, an aircraft door compatible temporary mounting system is described in the U.S. Pat. No. 5,927,648, entitled "Aircraft Based Sensing, Detection, Targeting, Communications, and Response Apparatus" issued Jul. 27, 1999 to Richard L. K. Woodland, and incorporated herein by reference. The Woodland invention is able to accommodate mounting on various aircraft without incurring any airframe modifications but is completely reliant on a mounting pallet to absorb flight induced loads which are then transferred from the torque pallet into the aircraft floor structure. The pallet mounted special mission assembly disclosed by Woodland when used in conjunction with rear loading/jettisoning cargo aircraft like a Lockheed Martin C-130 also compromises all other backend air drop operations which require use of the air deployment system (ADS) rails.

Accordingly there is an on-going, unaddressed need to achieve a flexible, rapidly installed, roll-on, cost effective, airborne $C^4ISR$ and special mission strut and pod mounting methodology.

Further, there is a need for such a strut and pod that permits a 360 degree field of view.

Further, there is a need for such a strut and pod that does not interfere with backend cargo air drop operations.

Further, there is a need for such a strut and pod that does not interfere with backend cargo air drop operations.

Still further, there is a need for such a strut and pod that provides in-flight extension and retraction of the strut and payload assemblies into the fuselage for reloading or changing sensor configurations, and provides an alternate load transfer path for externally mounted payload systems into the primary aircraft structure without using a pallet or necessitating modifications to the host aircraft.

SUMMARY OF THE INVENTION

The apparatus and system of the present invention solves the problem of temporarily mounting aircraft based special mission payload systems without compromising air drop operations by utilizing a rapidly installed Adaptive Mounting Plate (AMP) and load transfer brace assembly which interfaces with the host aircraft's Air Deployment System (ADS) rails, or conversely with an Adaptive ADS rail section when ADS rails are not resident on the aircraft. The specially contoured AMP is to provide precision fitment to the ADS Rail section which is generally achieved by means of cargo tie down rings which protrude through the AMP and are tensioned in place by adjustable cam lock means familiar to those skilled in the art of cargo handling systems. Other restraints means are also employed by way of bolts which connect the AMP to the ADS rails, and in turn the ADS rails to the host aircraft floor. Other alternative methodologies disclosed but not necessarily deemed advantageous include removing the cargo tie down bolts and interfacing the AMP directly to the bolt sockets using custom fitted bolts. Typically the AMP is machine milled to a specific contoured shape which reflects the bolt patterns, compatible metallurgy, and operability mechanisms of the specific rail section it is to be mounted to. For example ADS rail sections five or six adjacent the paratroop doors of a Lockheed Martin C-130 aircraft are different from those of an Alenia C-27J, yet the mounting methodology and load transfer path are identical as employed in the current invention. The AMP's for each aircraft may appear different but the connection, fastening, and load transfer methodologies are identical. The AMP is also typically milled from a single block of non-ferrous aerospace metal which accommodates restraint and bolt devices and unique positioning of same along the top and sides of the ADS rail. The AMP is effectively engineered to the adequate thickness to provide for the transfer of in-flight dynamic torque, lateral and other loads exerted upon the various mission payload pods and then transferred through the strut to the interior ADS rail, Load Transfer Brace (LTB) and associated cargo tie down "D" ring locations thereby precluding the requirement for a loads transfer (torque) pallet, or dedicated airframe modifications which interfere with aircraft backend operations. Although the embodiment of the present invention is optimized through use of a standard ADS rail section, a substitute or modified rail section can be used which interfaces to the host aircraft floor by matching the floor's unique cargo tie down bolt pattern and creating an interface directly to the floor upon which the AMP and LTB's can be attached.

The preferred embodiment of the present invention utilizes an electrically actuated strut which is attached to the AMP and installed through a fuselage side door orifice. The system apparatus as described herein is equipped with a NATO standard ordinance rack to accommodate the paid mounting and release of a variety of mission pods or stores which are suspended external of the host airframe. Said actuated strut also incorporating a redundant manual retraction and extension drive assembly, which is independent of the electrical drive system. Once in flight the strut can be articulated to a position below the lower periphery of the host aircraft fuselage to achieve a 360 degree field of view (FOV) for unobstructed electro optical, radar, RF or other sensor coverage, or can be used to jettison stores. The actuated strut can also be extended from the aircraft interior or retracted inboard back into the cargo bay while in flight for the purpose of maintaining mission security, reloading stores, changing sensors or other mission packages affixed to the end of the strut.

A second variant of the preferred embodiment of the present invention incorporates a non-actuated strut attached to the AMP which is of variable length and angle in X, Y, or Z axis which also transits under an indent of a door plug mounted within an open doorway to position a payload external of the aircraft in a predetermined position which remains static throughout the flight and does not require a 360 Field Of View (FOV).

For heavier payloads which require a diverse load transfer path into the cargo floor of the host aircraft the preferred apparatus of the AMP is equipped with at a plurality of articulated and in-flight removable Load Transfer Braces (LTB) which extend inboard from the AMP which in turn distributes the loads over a Floor Loads Plate (FLP) which is mechanically attached to at least a plurality of cargo floor tie down rings using adjustable cargo cam lock means.

Once the strut, AMP, and load transfer system are installed the preferred embodiment incorporates a temporary, one or two piece segmented pressurized door plug with a non-dedicated door retraction system which fully operable in flight. In either one or two piece versions the door plugs are indented about the lower periphery to accommodate the protrusion of the strut into the door panel in such a way as to provide a pressurized seal about the strut when the door plug is closed.

The integrated system of the embodiment of the present invention also incorporates connectivity to and utilization of on board workstations, aircraft positional data, communications systems, data processing systems, stores or other mission equipment linked to mounting and employment of the fixed position or articulated strut described herein. Further the complete system of the present invention utilizes various iron lung, litter, missile, winch, auxiliary or other existing electrical power interfaces to drive the various components and mission systems of the present invention on the host aircraft without the need for modifications.

Installation of the completed special mission system strut, AMP, load transfer braces, door plug, and associated assemblies of the present invention are installed in the unique manner described herein to enable use of the ADS rail system, operability of the host door plug, and extension and retraction of the strut while in flight without interfering with the host aircraft's normal performance envelope, emergency egress, air drop or other back end operations of the host aircraft.

DETAILED DESCRIPTION OF THE INVENTION

The invention is now described in terms of the FIGURES to more fully delineate in detail the scope, materials, components, conditions, and methods associated with the design, and employment of the present invention.

Figure 1:
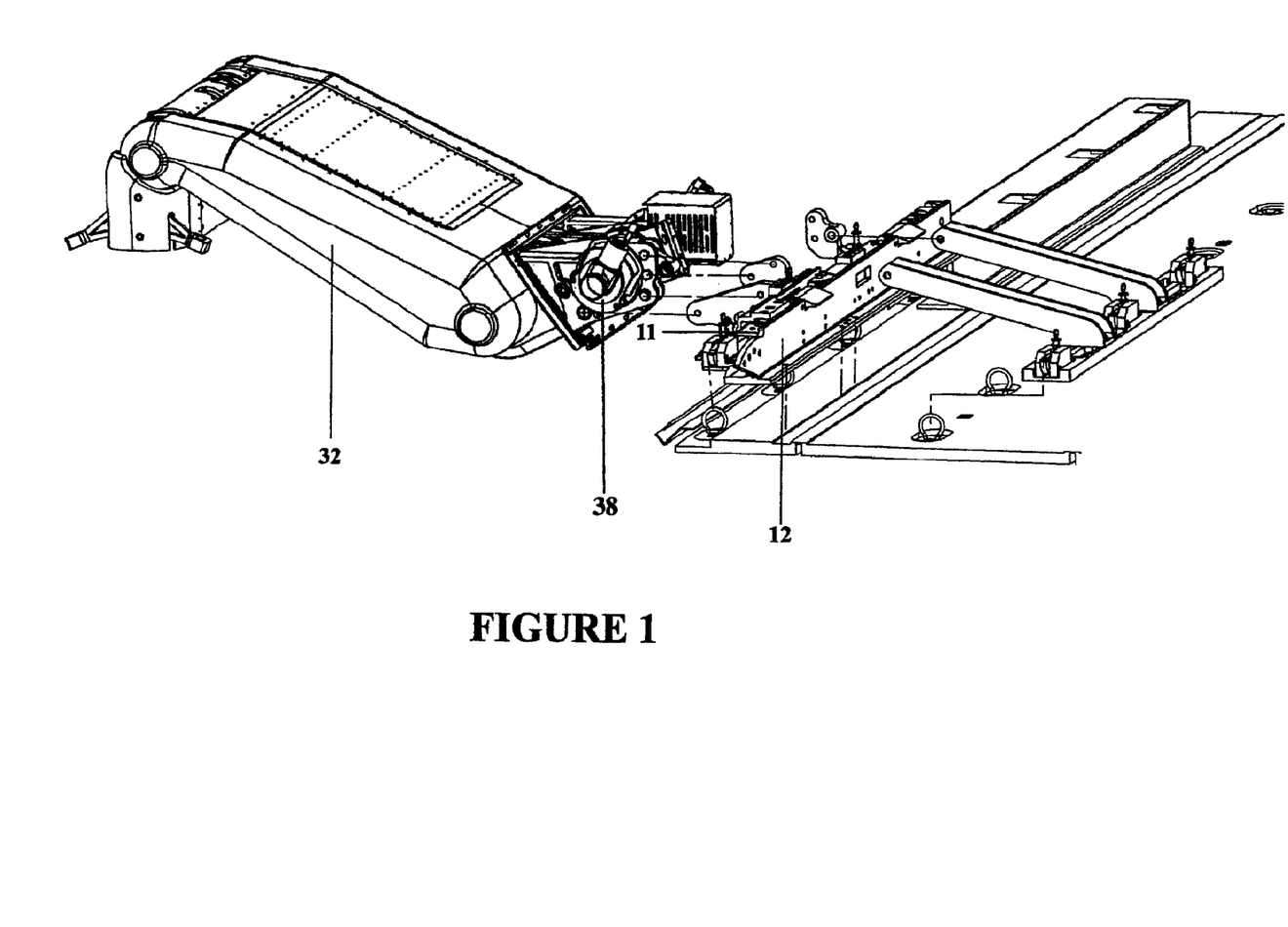
FIG. 1 is an exploded view of the ADS Rail section and AMP with bolt patterns, 20 cam locks, and overall attachment methodologies of all plate angles holes and fastening components.
Figure 1A:
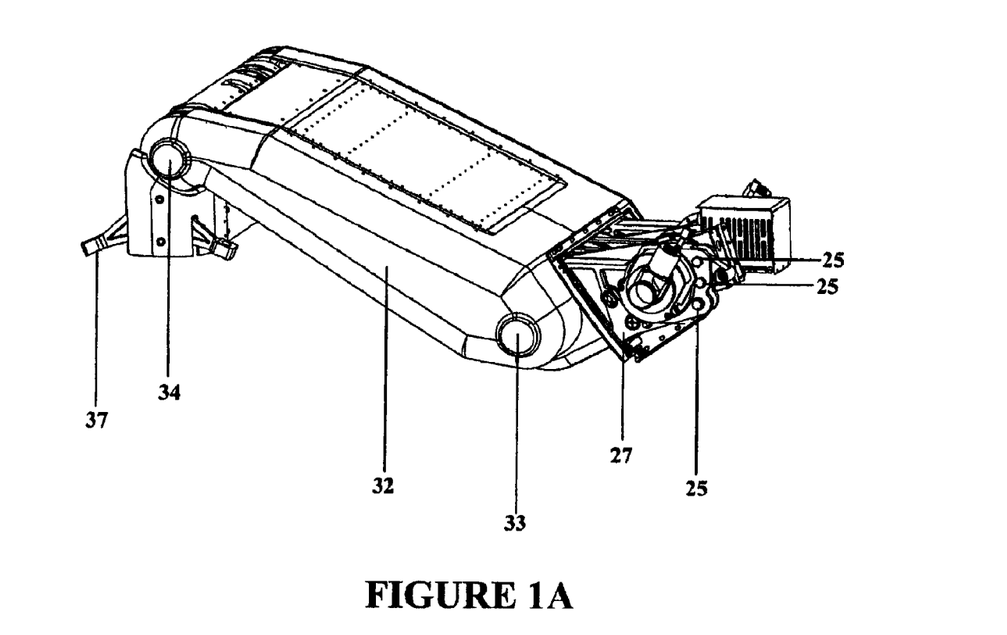
FIG. 1A is an exploded overview of the primary structural and mechanical attachment mechanism of a strut of the present invention including the motor housing bolt assembly, strut motor housing casing, shoulder armature assembly, strut, secondary wrist armature assembly, and adjustable sway braces.
Figure 1B:
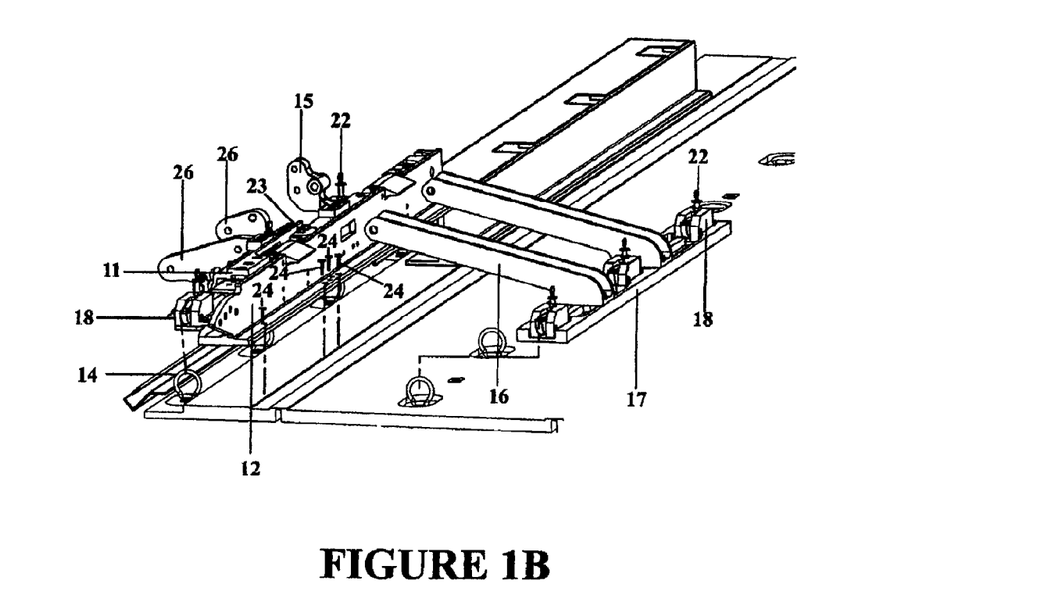
FIG. 1B is an exploded overview of the primary structural and mechanical attachment mechanism of a strut of the present invention including the adaptive mounting plate, adjustable cam locks, cargo tie down "D" rings, ADS rail, load transfer braces, floor load plate, adjustment bolts, load transfer brace flange, AMP restraining bolts, ADS restraining bolts, and AMP motor housing flanges.

FIGS. 1 through 1B depicts an exploded overview of the primary structural and mechanical attachment mechanisms of a strut of the present invention assembled as it would normally be connected together and installed to achieve fitment of a pod or other apparatus aboard a Lockheed-Martin C-130 aircraft 1, including one or more adaptive mounting plates (AMP) 11. Adaptive mounting plates 11 can be perforated with bolt holes which interface and otherwise permit connectivity to a standard ADS rail 12, by means of multiple AMP restraint bolts 23 (as shown in FIG. 1B). Once the adaptive mounting plates 11 have been secured to the ADS rail 12, or a section of the ADS rail 12, the rail or section can be positioned and secured to the aircraft floor utilizing multiple ADS restraint bolts 24 and/or cargo tie down "D" rings 14, with adjustable cam locks 18 which can be tensioned by turning the adjustment bolt 22, until the ADS rail 12, section is secure against the aircraft floor. For aircraft not having an ADS rail 12 already installed, those skilled in the art of aircraft component fabrication can install an ADS rail or section that can be made to match the host aircraft cargo floor bolt pattern. In this manner, the present invention can be made to accommodate a variety of airframe types.

Figure 2:
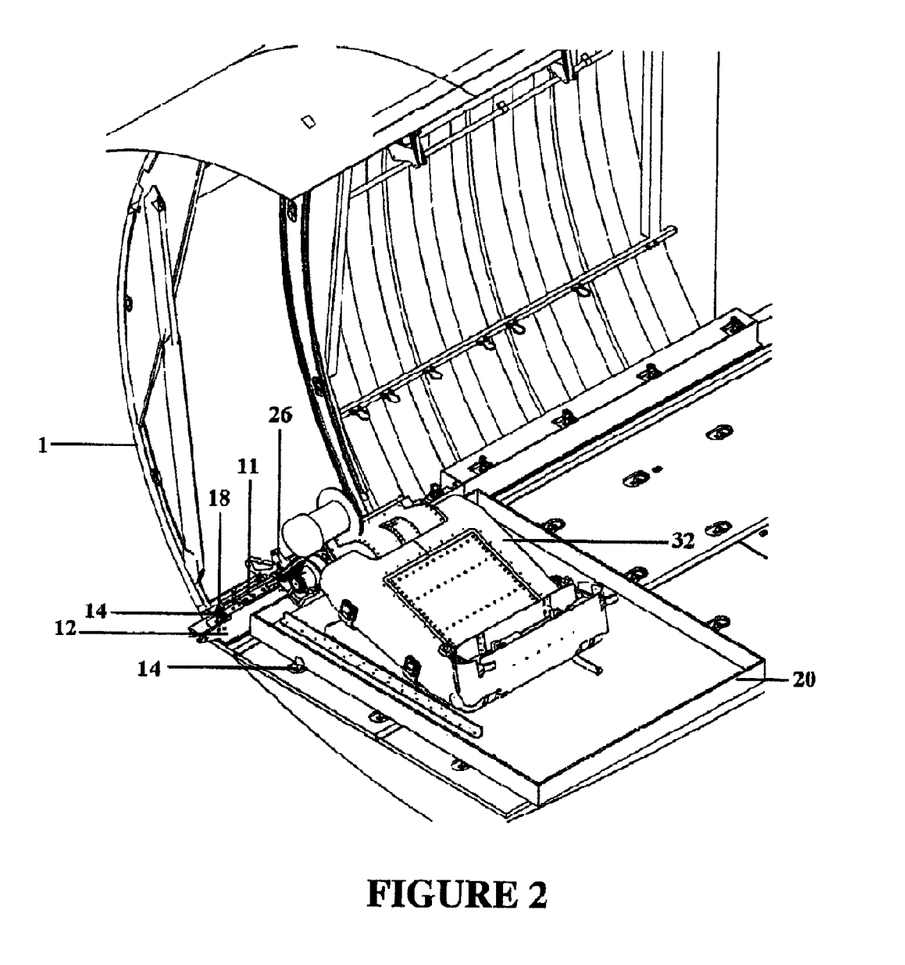
FIG. 2 is a rotationally articulated strut being aligned to the AMP using the lower section of the transport case after the AMP has been attached to the ADS rail.

As depicted in FIG. 2, the current invention can be housed within a modular case or cases so as to facilitate transport and aid in mechanical interface alignment. As shown, the invention can be in stored and transported in a strut transport and alignment case 20, a portion of which can be temporarily secured to the aircraft floor when the strut is to be installed. A motor housing bolt assembly 25 (as shown in FIG. 1A) can be been inserted through and secured to an AMP motor housing flange 26, to connect the strut 32, about a shoulder armature assembly 33, with the adaptive mounting plate (AMP) 11. Once the strut 32 is secured to the adaptive mounting plate (AMP) 11, the shoulder armature assembly 33 can be rotated outboard and the strut transport & alignment case 20, disconnected and removed from the host aircraft. The strut is rotationally connected to the aircraft.

Figure 4:
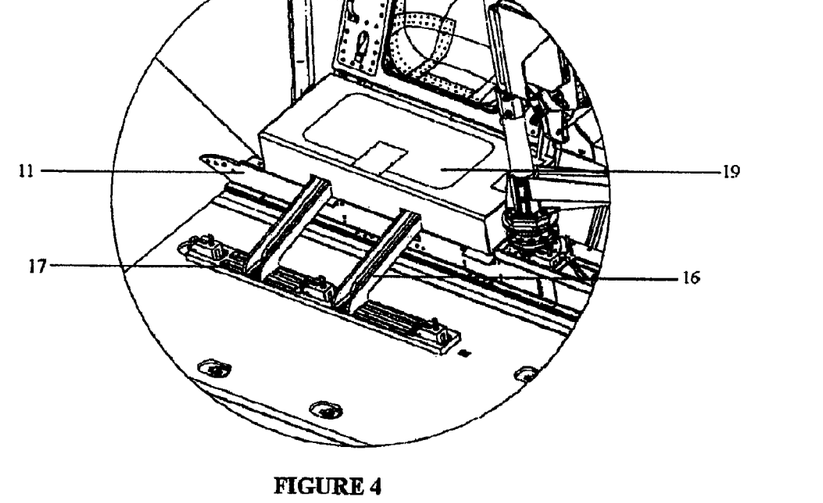
FIG. 4 depicts the completed assembly installed and covered by a removable armored housing.
Figure 5:
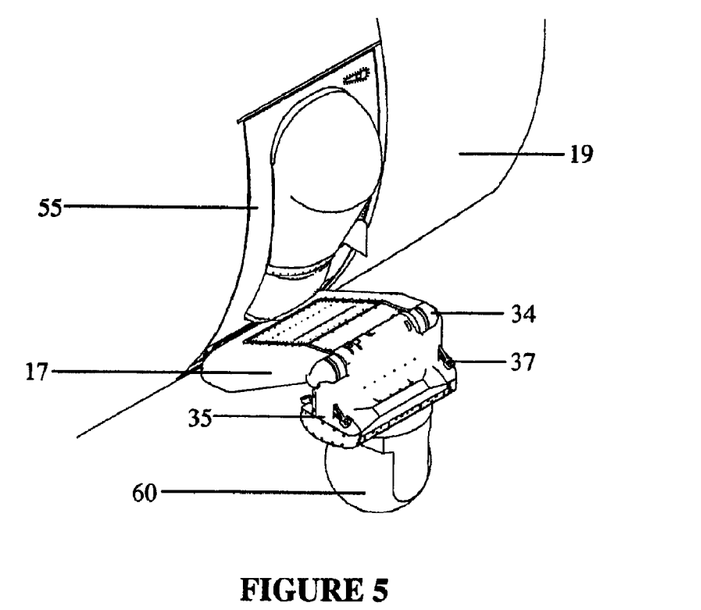
FIG. 5 is an exterior depiction of a strut in the retracted position with a single sensor attached to BRU-12 bomb rack with, conformal fairing, and sway braces deployed and a observer bubble window installed within the door plug.

The shoulder armature assembly 33 accommodates the mounting and functional integration of one or more electrical drive motors 38. In one embodiment, two redundant electrical drive motors 38 are each equipped with a brake disengagement handle 39 for use in the event that both drive motor 38 fail. In such a failure the brake disengagement handle 39 can be activated which allows the motors to turn freely thereby permitting a hand actuated speed wrench to be inserted into the manual retraction socket 40, to retract or extend the rotationally actuated strut 32. As shown in FIG. 4. the entire motor housing and shoulder armature assembly 33, assembly can accommodate an AMP armor housing 19, to protect the manned operator typically located above at a bubble viewing port.

As noted in FIGS. 5, 6, 7, and 9 the apparatus of the present invention also incorporates a secondary wrist armature assembly 34, which is mechanically connected to the shoulder armature assembly 33, by means of a geared rotating linkage which keeps the wrist armature assembly 34 in the vertical position as the rotationally actuated strut 32, is articulated from a retracted to fully extended position exterior of the aircraft. This particular feature does not apply when fully retracting the present invention into the fuselage of the host aircraft. The rotationally actuated strut 32, can be equipped with a standard NATO ordinance rack 35, with a fourteen inch set of locking lugs which can also be fitted with a pylon slipper to accommodate other ordinance racks including a triple ejector rack 36. Regardless of the ejector rack employed, the payload can be stabilized by lateral, gust, and other wind loads by a pair of adjustable sway braces 37, which can be fitted for a variety of pods and payloads suspended at the end of the rotationally actuated strut 32. The operator control mechanism for the strut assembly can located in a handheld device adjacent the door plug or built into the door plug using indicator lights, cabling and switches common to those skilled in aircraft engineering.

Figure 7:
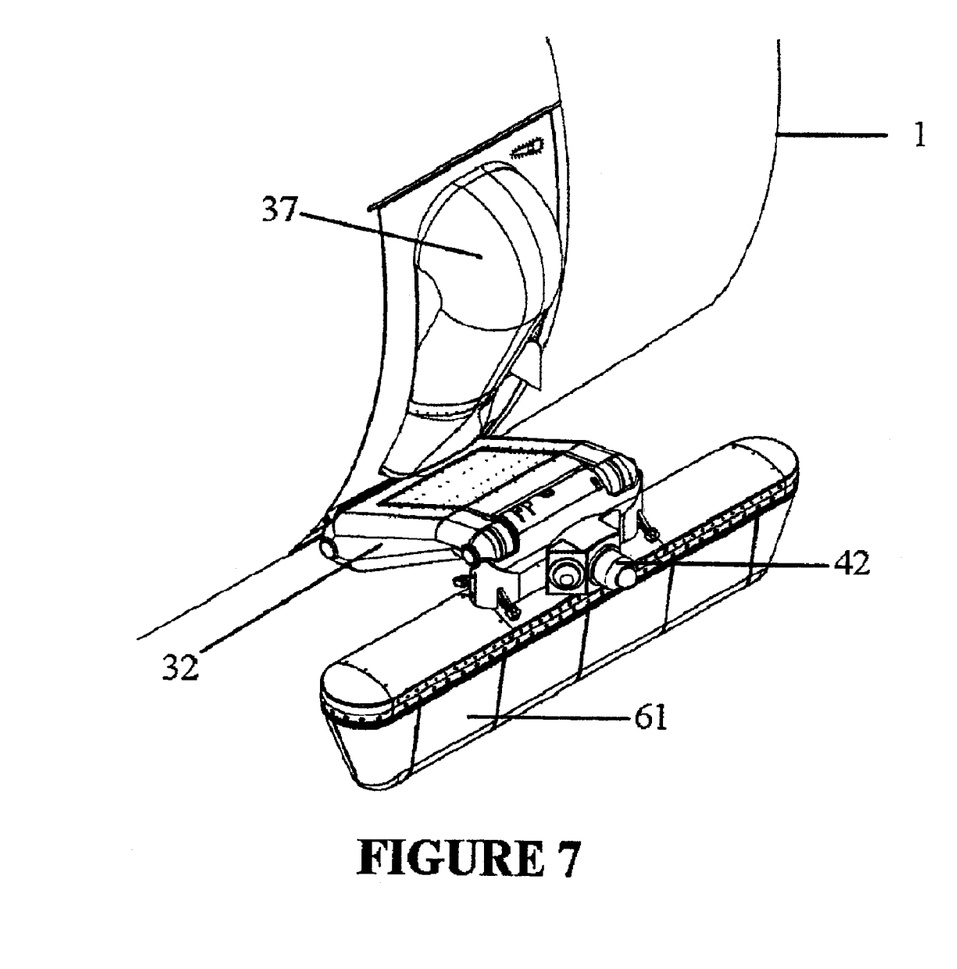
FIG. 7 depicts and exterior view of an articulated strut in the retracted position with an RF communications pod and EWSP missile counter measures fairing mounted outboard of the strut's secondary wrist assembly with a bubble door and sway braces deployed.

As depicted in FIG. 7, the rotationally actuated strut 32, can also accommodate an Electronic Warfare Self Protection, EWSP fairing assembly 42, attached as a knuckle adjacent the wrist armature assembly 34.

Figure 8:
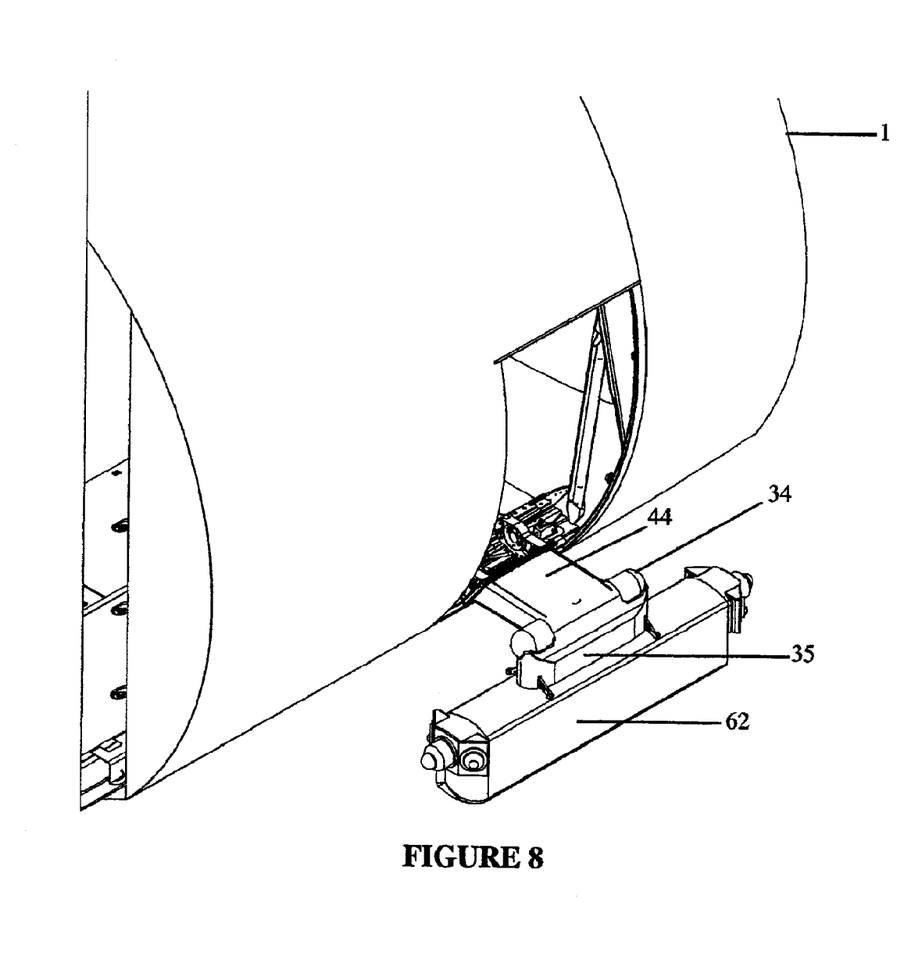
FIG. 8 depicts a non-articulated, fixed position strut with EWSP missile countermeasures pod equipped with IR detection set, laser countermeasures, and an ALE-55 towed decoy.
Figure 9:
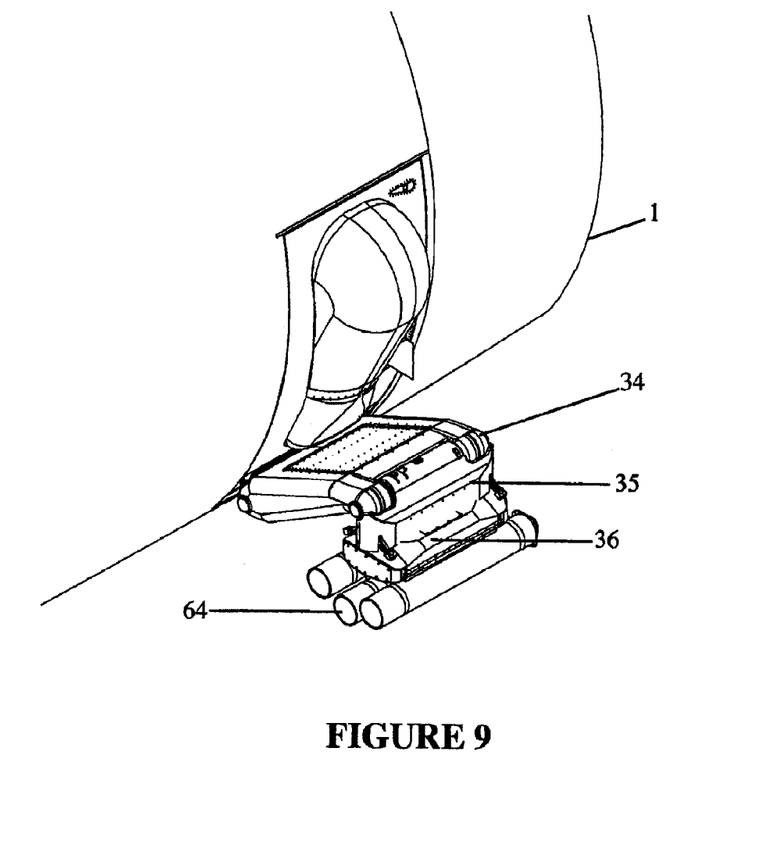
FIG. 9 depicts an articulated strut with a triple ejector rack fitment on the strut's BRU-12 rack carrying three releasable, in-flight re-loadable, doorway form compliant stores.

As depicted in FIG. 8, a non articulated strut 44, can also be mounted to the adaptive mounting plate (AMP) 11. Such a configuration can be utilized when rotation or other motion activation is not required, as in the case of hosting dual EWSP missile countermeasures pod 62.

Figure 3:
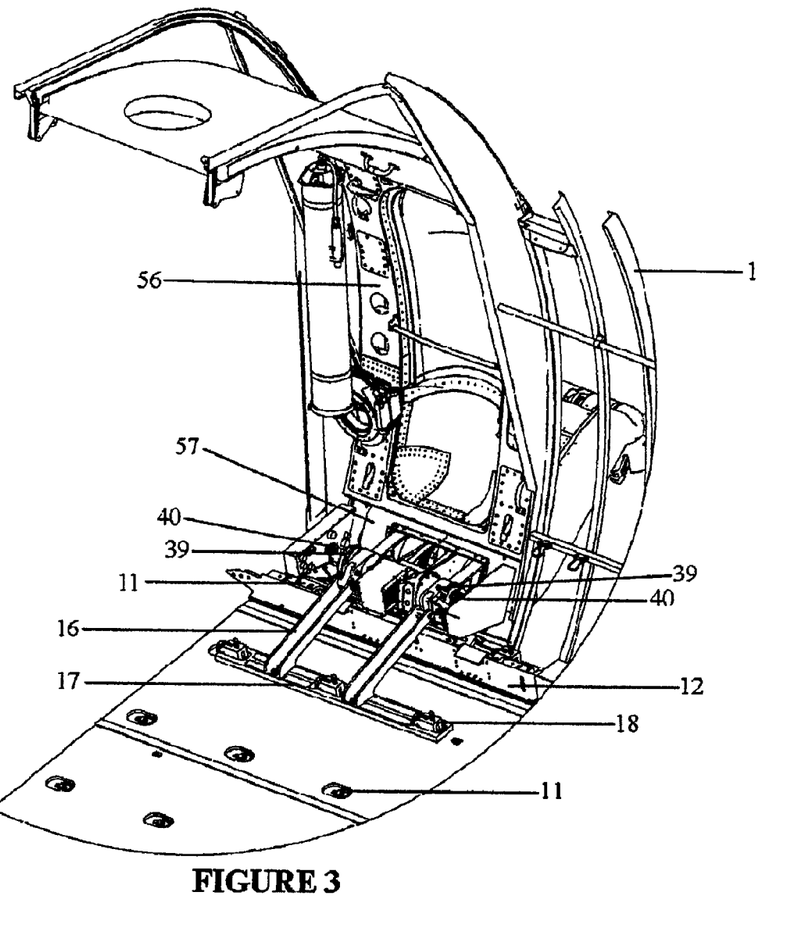
FIG. 3 depicts a strut deployed with ADS rail section and AMP attached to same with both the lower close-out panel and upper door plug panel installed with, manual retract sockets, disengaging clutch handles, dual electric drives, and control box.
Figure 6:
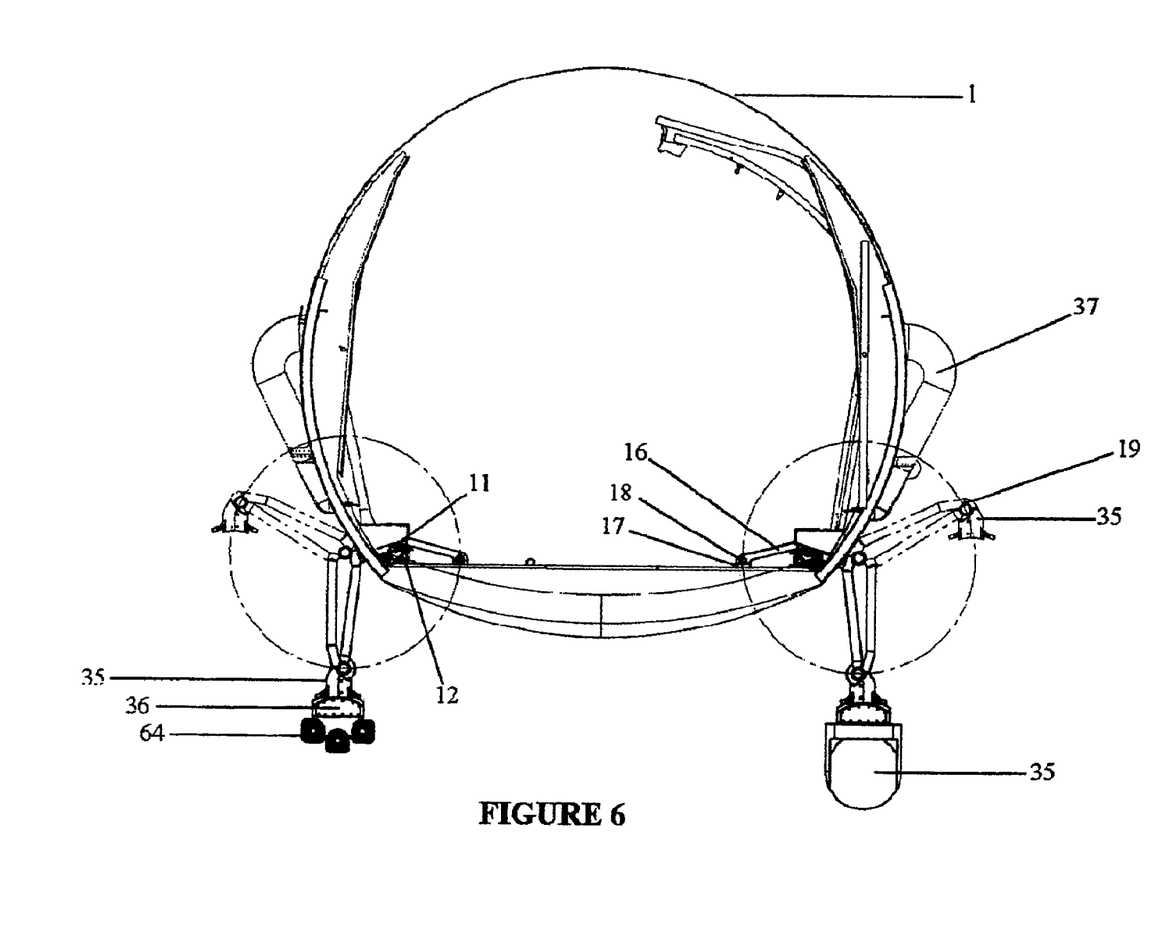
FIG. 6 depicts an external perspective of the subject apparatus with two struts deployed simultaneously outboard of the aircraft fully extended, wherein one is equipped with a triple ejector rack loaded with three dispensable stores, and the other with an integrated EO/IR surveillance and targeting sensor turret. In both instances the complete range of motion arcs of the struts into the aircraft is also depicted illustrating the ability of the strut gearing and drive mechanisms to accommodate in flight retraction and extension for sensor change and stores re-loading.
Figure 10:
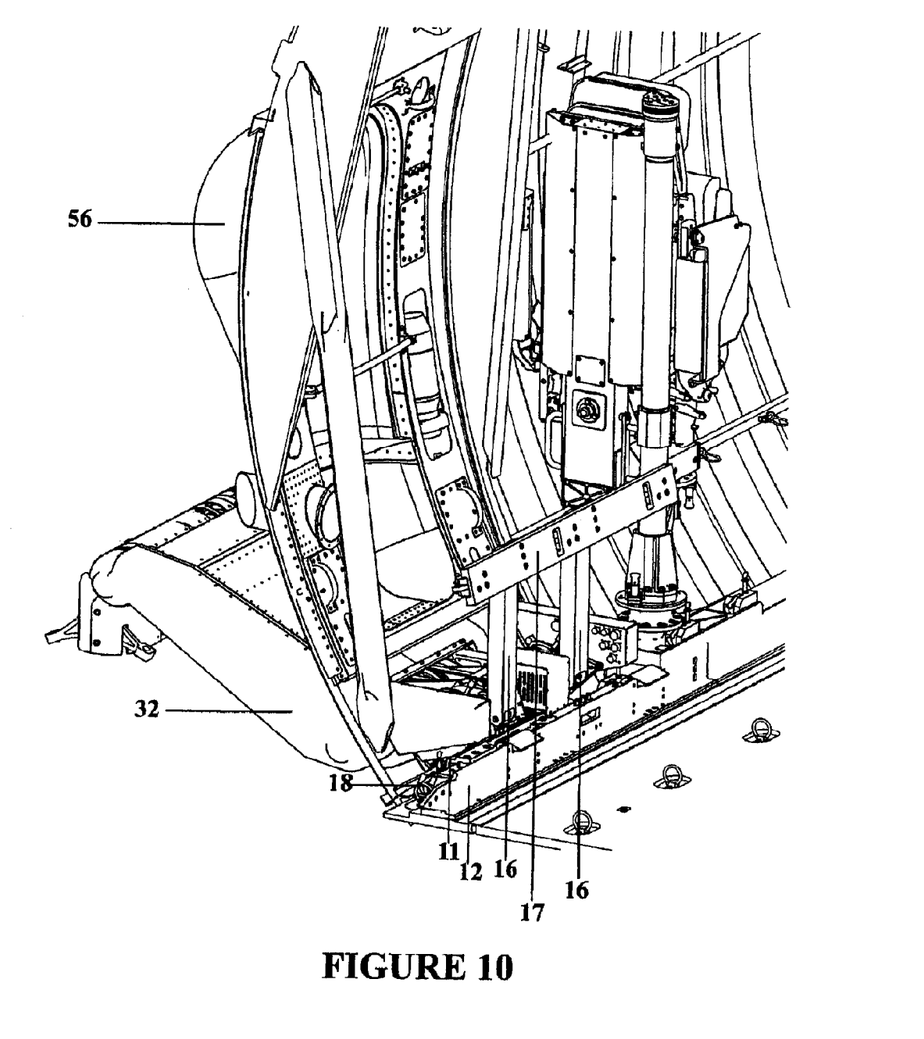
FIG. 10 depicts the installation of a completed mission assembly with the strut retracted, observer chair stowed, and the load transfer braces in the up and retracted position so as to enable use of the ADS rails for air drop.

As depicted in FIGS. 3, 4, and 6, the embodiment of the present invention can also accommodate a rapidly removable pair of load transfer braces (LTB) 16 which can be hinged to the strut motor housing casing 27. Such a configuration effectively increases the externally suspended payload weight of the sensor pods or other externally hung stores. As shown in FIG. 10, if during the process of accommodating the increased payload the host aircraft must engage in air drop activities, the transfer load transfer braces (LTB) 16 hinged to a load transfer brace flange 15 can be retracted to their vertical positions, the pallets jettisoned, and the load transfer brace (LTB) 16 and floor load plate (FLP) 17 can be re-secured to the host aircraft cargo floor cargo tie down "D" rings 14 using adjustable cam locks 18. It is noted although not depicted that a greater number and length of load transfer braces (LTB) 16 and floor load plates (FLP) 17 could be added to accommodate an increased number of cargo tie down "D" rings, thereby providing a greater load dispersal area and corresponding increase in payload capability.

Method of Operation

The preferred methodology as described herein for installing and employing the apparatus of the current invention typically involves two crew members familiar with airframe maintenance. The entire assembly can be man portable and can consist of a strut transport & alignment case 20, a payload case of suitable size and typically not exceeding 400 pounds, and typical single sensor pod/ordinance loader to position and elevate the sensor pod once the strut is installed.

The installation sequence can begin with the attachment of the strut transport & alignment case 20 to the floor of a host aircraft, for example a Lockheed-Martin C-130 aircraft 1, wherein the paratroop door would be opened and secured. The adaptive mounting plate (AMP) 11 could be secured to the ADS rail 12, and the rotationally actuated strut 32, assembly secured to the AMP motor housing flange 26, by means of the motor housing bolt assembly 25. At this point the rotationally actuated strut 32, would be rotated about the shoulder armature assembly 33, through the open doorway, and the single piece door plug 55, or alternatively the combined door plug upper panel 56, and door plug lower panel 57, installed to seal the doorway.

The load transfer braces (LTB) 16 and floor load plate (FLP) 17 assembly could then be lowered into position and connected to multiple cargo tie down "D" ring 14, means by using several adjustable cam locks 18 secured in place by multiple adjustment bolts 22. Finally, the entire shoulder armature assembly 33, twin drive motors 38, and associated electrical and mechanical gearing could be covered by a removable AMP armor housing 19. The entire system could be checked using a localized controller to verify indicator light positions against the actual position of the strut. The strut emergency manual retract could also be tested. The door assembly could then be tested for functionality and non-interference with the rotationally actuated strut 32, assembly.

The rotationally actuated strut 32 assembly could be secured in the up or retracted position external to the aircraft in readiness for attachment of various payloads to the NATO ordinance rack 35, or triple ejector rack 36. A typical bomb/ordinance loader carrying any number of payloads including a single sensor 60, and RF antenna pod 61, and EWSP missile countermeasures pod 62, jettisonable stores 64, or other sensor pod could be positioned below the NATO ordinance rack 35, or triple ejector rack 36, and the mission components physically attached to the rotationally actuated strut 32, assembly using procedures and methods common within the field of ordinance loading. The loader could then be removed along with the strut transport and alignment case 20, and the various power, data, pod and control system cables connected for diagnostics testing and ultimate mission usage.

While preferred embodiments have been shown and described, various substitutions and modifications may be made without departing from the spirit and scope of the invention. Accordingly it is to be understood that the present invention has been described by way of illustration and not limitation.

What is claimed is:

1. A mission payload mounting apparatus comprising:
an adaptive mounting system (AMS) plate, wherein the AMS plate is milled to accommodate one or more restraint and bolt devices specific to Air Deployment System (ADS) rails of an aircraft, wherein the restraint and bolt devices are operable to interface the AMS plate to the ADS rails; and
a strut that is coupled to the AMS plate, wherein the strut extends from the interior of the aircraft to the exterior of the aircraft via a pressurized door plug that interfaces to the aircraft.

2. The mission payload mounting apparatus of claim 1, wherein the AMS plate is coupled to the floor of the aircraft via the ADS rails.

3. The mission payload mounting apparatus of claim 1, wherein:
a bolt assembly is coupled to the strut;
a flange is coupled to the AMS plate; and
the strut is coupled to the AMS plate via the bolt assembly and the flange.

4. The mission payload mounting apparatus of claim 1, wherein the strut is capable of being rotationally actuated.

5. The mission payload mounting apparatus of claim 4, wherein the strut is capable of being rotationally actuated by:
one or more electric drive motors; or
one or more hand wrenches.

6. The mission payload mounting apparatus of claim 4, further comprising a shoulder armature assembly coupled to a first end of the strut, wherein the strut is coupled to the AMS plate via the shoulder armature assembly.

7. The mission payload mounting apparatus of claim 6, further comprising a wrist armature assembly, wherein the wrist armature assembly is coupled to a second end of the strut.

8. The mission payload mounting apparatus of claim 7, wherein the wrist armature assembly is mechanically connected to the shoulder armature assembly.

9. The mission payload apparatus of claim 8, wherein the wrist armature assembly is mechanically connected to the shoulder armature assembly and the wrist armature assembly is capable of being maintained in a vertical position while the strut is rotationally actuated through a range of angles.

10. The mission payload apparatus of claim 9, wherein the vertical position is vertical in relation to the aircraft.

11. The mission payload apparatus of claim 9, wherein the strut is capable of being articulated to a position below a lower periphery of the aircraft.

12. A method comprising:
interfacing an adaptive mounting system (AMS) plate to Air Deployment System (ADS) rails of an aircraft, wherein the AMS plate is milled to accommodate one or more restraint and bolt devices specific to the ADS rails and operable to interface the AMS plate to the ADS rails;
coupling a strut to the AMS plate, wherein the strut is coupled such that it is within an interior of the aircraft;
rotationally actuating the strut through a doorway in the aircraft from the interior of the aircraft to an exterior of an aircraft; and
installing a pressurized door plug into the doorway.

13. The method of claim 12, further comprising:
interfacing a first end of a removable load transfer brace to the AMS plate, wherein the AMS plate extends inboard;
interfacing a second end the removable load transfer brace to the floor.

14. A method comprising:
while an aircraft is in flight, rotationally actuating a strut that extends from an interior of the aircraft to an exterior of the aircraft via a pressurized door plug that interfaces to the aircraft, wherein the strut is coupled to an adaptive mounting system (AMS) plate that is milled to accommodate one or more restraint and bolt devices specific to Air Deployment System (ADS) rails of an aircraft, wherein the restraint and bolt devices are operable to interface the AMS plate to the ADS rails.

15. The method of claim 14, wherein the strut is rotationally actuated to a position below a lower periphery of the aircraft.

16. The method of claim 14, wherein a shoulder armature assembly is coupled to a first end of the strut and the strut is coupled to the AMS plate via the shoulder armature assembly.

17. The method of claim 16, wherein a wrist armature assembly is coupled to a second end of the strut and the wrist armature assembly is mechanically connected to the shoulder armature assembly.

18. The method of claim 17, wherein the wrist armature assembly in maintained a vertical position while the strut is rotationally actuated.

19. The method of claim 18, wherein the vertical position is vertical in relationship to the aircraft.

* * * * *